US011516413B2

(12) United States Patent
Östlund et al.

(10) Patent No.: US 11,516,413 B2
(45) Date of Patent: Nov. 29, 2022

(54) ADAPTIVE READOUT FROM AN OPTICAL BIOMETRIC SENSOR TO A HOST DEVICE (71) Applicant: Fingerprint Cards Anacatum IP AB, Gothenburg (SE)

(72) Inventors: Petter Östlund, Lund (SE); Hans Thörnblom, Hålta (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/760,916

(22) PCT Filed: Jul. 8, 2021

(86) PCT No.: PCT/SE2021/050699
§ 371 (c)(1),
(2) Date: Mar. 16, 2022

(87) PCT Pub. No.: WO2022/025812
PCT Pub. Date: Feb. 3, 2022

(65) Prior Publication Data
US 2022/0345647 A1 Oct. 27, 2022

(30) Foreign Application Priority Data
Jul. 29, 2020 (SE) .................. 2050928-7

(51) Int. Cl.
*H04N 5/353* (2011.01)
*H04N 5/378* (2011.01)
(Continued)

(52) U.S. Cl.
CPC ....... *H04N 5/3532* (2013.01); *G06V 40/1318* (2022.01); *G06V 40/1365* (2022.01); *H04N 5/378* (2013.01)

(58) Field of Classification Search
None
See application file for complete search history.

(56) References Cited

U.S. PATENT DOCUMENTS

| 6,728,366 B1 | 4/2004 | Barkaro et al. |
| 8,675,107 B2 | 3/2014 | Yamashita et al. |

(Continued)

FOREIGN PATENT DOCUMENTS

| JP | S62115518 A | 5/1987 |
| JP | H04291822 A | 10/1992 |
| JP | H08335878 A | 12/1996 |

OTHER PUBLICATIONS

Yin et al., "A 368 x 184 Optical Under-Display Fingerprint Sensor with Global Shutter and High-Dynamic-Range Operation", Mar. 2020, IEEE, Custom Integrated Circuits Conference (CICC), pp. 1-4 (Year: 2020).*

(Continued)

*Primary Examiner* — James M Anderson, II
(74) *Attorney, Agent, or Firm* — RMCK Law Group, PLC (57) ABSTRACT

The present invention relates to an optical biometric sensor (100) comprising: an image sensor (302) comprising an array (301) of photodetectors (304), wherein for acquiring sensing signals, the image sensor is controllable to sequentially start exposure of subsets (306, 308, 309) of photodetectors; and a timing circuitry (310) configured to control the start of exposure of a subset of photodetectors based on a present data transfer capacity on a data transfer bus (312) configured to transfer data indicative of the acquired sensing signals from the optical biometric sensor to a host device (314).

20 Claims, 6 Drawing Sheets (51) Int. Cl.
   *G06V 40/13*   (2022.01)
   *G06V 40/12*   (2022.01)

(56) References Cited

U.S. PATENT DOCUMENTS

| | | | |
|---|---|---|---|
| 10,798,329 | B2 | 10/2020 | Kobayashi et al. |
| 11,227,135 | B2 | 1/2022 | Hung et al. |
| 11,270,615 | B2 | 3/2022 | Choi et al. |
| 11,315,492 | B2 | 4/2022 | Choi et al. |
| 2003/0016297 | A1 | 1/2003 | Shigeta |
| 2010/0026844 | A1 | 2/2010 | Hopkins |
| 2013/0016798 | A1 | 1/2013 | Velazquez et al. |
| 2013/0214127 | A1 | 8/2013 | Ohya et al. |
| 2014/0036120 | A1 | 2/2014 | Hagihara |
| 2014/0204427 | A1 | 7/2014 | Nakazawa |
| 2014/0367550 | A1 | 12/2014 | Aisu et al. |
| 2014/0368713 | A1 | 12/2014 | Matsuda |
| 2015/0138411 | A1 | 5/2015 | Nakamura et al. |
| 2015/0163436 | A1 | 6/2015 | Hijikata et al. |
| 2015/0281539 | A1 | 10/2015 | Ueki et al. |
| 2015/0281616 | A1 | 10/2015 | Muto et al. |
| 2015/0323382 | A1 | 11/2015 | Valer'evich et al. |
| 2016/0182845 | A1 | 6/2016 | Hagihara |
| 2016/0211299 | A1 | 7/2016 | Arita |
| 2017/0237914 | A1 | 8/2017 | Cho et al. |
| 2017/0308152 | A1 | 10/2017 | Trichy |
| 2018/0027174 | A1 | 1/2018 | Sengoku |
| 2018/0270438 | A1 | 9/2018 | Niwa et al. |
| 2019/0006412 | A1 | 1/2019 | Ando et al. |
| 2019/0147213 | A1* | 5/2019 | Yeke Yazdandoost ........ G06V 40/1318 382/124 |
| 2019/0222786 | A1 | 7/2019 | Kobayashi |
| 2019/0312079 | A1 | 10/2019 | Odahara |
| 2020/0084412 | A1 | 3/2020 | Matsuno |
| 2020/0186734 | A1 | 6/2020 | Nagawa |
| 2020/0195870 | A1 | 6/2020 | Shim et al. |
| 2020/0366863 | A1 | 11/2020 | Etou et al. |
| 2021/0021773 | A1 | 1/2021 | Lee et al. |
| 2021/0087614 | A1 | 3/2021 | Hall et al. |
| 2021/0099657 | A1 | 4/2021 | Kuroda |
| 2021/0144330 | A1 | 5/2021 | Otaka |
| 2021/0176418 | A1 | 6/2021 | Yin et al. |
| 2021/0185250 | A1 | 6/2021 | Moue et al. |
| 2021/0326623 | A1 | 10/2021 | Kato et al. |
| 2021/0377470 | A1 | 12/2021 | Malone et al. |
| 2021/0385345 | A1 | 12/2021 | Takahashi |
| 2021/0399726 | A1 | 12/2021 | Yamazaki et al. |
| 2021/0409623 | A1 | 12/2021 | Jang et al. |
| 2022/0036818 | A1 | 2/2022 | Yin |
| 2022/0046197 | A1 | 2/2022 | Moue |
| 2022/0166949 | A1 | 5/2022 | Moue et al. |

OTHER PUBLICATIONS

International Search Report and Written Opinion for Application No. PCT/SE2021/050699 dated Sep. 9, 2021 (8 pages).

International Search Report and Written Opinion for International Application No. PCT/SE2021/050696 dated Sep. 2, 2021 (9 pages).

Yin et al. "Optical Under-Display Fingerprint Sensor With Global shutter and High-Dynamic-Range Operation" In 2020 IEEE Custom Integrated Circuits Conference (CICC), pp. 1-4, Mar. 2020 (4 pages).

U.S. Appl. No. 17/760,874, filed Mar. 16, 2022, Östlund.

* cited by examiner

ADAPTIVE READOUT FROM AN OPTICAL BIOMETRIC SENSOR TO A HOST DEVICE

CROSS-REFERENCE TO RELATED APPLICATIONS

This application is a 371 U.S. National Stage of International Application No. PCT/SE2021/050699, filed Jul. 8, 2021, which claims priority to Swedish Patent Application No. 2050928-7, filed Jul. 29, 2020. The disclosures of each of the above applications are incorporated herein by reference in their entirety.

FIELD OF THE INVENTION

The present invention generally relates to an optical biometric sensor and to a timing circuitry arrangeable in an optical biometric sensor.

BACKGROUND

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Fingerprint sensing systems may include optical fingerprint sensors which technology has been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor or be of camera type optical sensor.

When a biometric sensor such as an optical sensor is included in a host device, data must be transferred from the biometric sensor to the host device over a data bus e.g. a serial peripheral interface. Such a data bus has a limited data transfer capability and is often controlled by the host device whereas the biometric sensor controls the data readout from its pixel matrix. This may lead to conflicts between the amount of data produced by the biometric sensor and the capability of the data bus to handle the transfer of data to the host, and thereby to sub-optimal utilization of the data transfer capability on the bus, or to the need for costly buffer solutions.

In other words, there is room for improvements with regards to better utilize the data transfer capability on the bus between the biometric sensor and a host device.

SUMMARY

In view of above-mentioned and other drawbacks of the prior art, it is an object of the present invention to provide an optical biometric sensor having a timing circuitry to alleviate at least some of the drawbacks of prior art.

According to a first aspect of the invention, there is provided an optical biometric sensor comprising: an image sensor comprising an array of photodetectors, wherein for acquiring sensing signals, the image sensor is controllable to sequentially start exposure of subsets of photodetectors; and a timing circuitry configured to control the start of exposure of a subset of photodetectors based on a present data transfer capacity on a data transfer bus configured to transfer data indicative of the acquired sensing signals from the optical biometric sensor to a host device.

The present invention is based on the realization that the start of exposure of subsets of photodetectors is closely related to the production rate of the data that is desirable to transfer on the data transfer bus. Therefore, if the start of exposure is controlled based on the present data transfer capacity, it can be ensured that the amount of produced data can be transferred on the bus without unnecessary delay. In other words, the data production rate is adapted to the capacity of the data transfer bus. In this way, the data transfer bus can handle the data as it is read-out.

Generally, an exposure time of the photodetectors is known from e.g. predetermined imaging settings. Consequently, the time until exposure has finished can be determined, if the start of exposure is known. This also means that by having knowledge of the start of exposure, and the exposure time duration, it can be determined when sensing signals is to be read-out from the image sensor and subsequently transferred on the bus, i.e. at what time instant it is desirable that the bus has sufficient capacity to transfer the new data. The present data transfer capacity relates to the rate and capability for the data transfer bus to transfer data to the host device. Therefore, the start of exposure can be controlled such that the produced data from the image sensor can be adapted according to the data transfer capacity of the bus and be immediately transferred on the data transfer bus, preferably without the need for intermediate storage of data. For example, the start of exposure is at a time that ensures that when the data has been read-out, the data transfer bus has completed a previous transfer action and is able to receive the newly produced data.

Embodiments of the present disclosure allows for optimizing the data transfer between the optical biometric sensor and a host device even if they run on different clocks which inevitably leads to asynchronous clocks at different speeds and consequently to, as is the case in prior art, non-optimized use of the communication interface.

The image sensor may be any suitable type of image sensor, such as a CMOS or CCD sensor connected to associated control circuitry. In one possible implementation the image sensor is a thin-film transistor (TFT) based image sensor which provides a cost-efficient solution for under display fingerprint imaging sensors. The operation and control of such image sensors can be assumed to be known and will not be discussed herein. The TFT image sensor may be a back illuminated TFT image sensor or a front illuminated TFT image sensor. The TFT image sensor may be arranged as a Hot-zone, Large Area or Full display solution.

A photodetector is generally a pixel of the image sensor.

Exposure of a photodetector, as is known to the skilled person, relates to that the photodetector is active to collect light for acquiring an image.

The sensing signals acquired by the photodetectors are indicative of a portion of the acquired image, and generally relate to the amount of light received by the specific photodetector during the exposure time. The operation of photodetector, i.e. pixel, of an optical sensor is known per se to the skilled person and will not be discussed herein.

A subset of photodetectors may relate to any subset, e.g. one or more photodetectors that simultaneously are active for being exposed to light for acquiring an image.

In embodiments, the timing circuitry may be configured to control the start of exposure of a next subset of photodetectors such that a data production rate resulting from the acquired sensing signals is below or equal to the present data transfer capacity on the data transfer bus. Advantageously, this ensures that the produced data can be immediately transferred on the data transfer bus as soon as it is produced, thereby without or with reduced need for intermediate storage. Information about the present data transfer capacity can be received from the data transfer bus, or it can be set by the bus itself, i.e. the data transfer bus may have a known fixed transfer rate capacity, or it can be measured.

In embodiments, the optical biometric sensor may be configured to perform data processing to adjust a data production rate resulting from the acquired sensing signals to thereby adjust an amount of data to transfer on the data transfer bus. In this way may the data production rate from the image sensor be adjusted so that the produced data do not exceed the present data transfer capacity of the data transfer bus, or so that more useful data can be transferred, thereby improving the utilization of the data transfer bus to transfer relevant data. Thus, the data processing changes the data rate or the amount of data to be transfer to the host device. The data processing may be digital data processing.

In embodiments, the data processing may be local post-processing settings of the image sensor adapted to cause a reduction in data production rate. Such local post-processing settings may be masking, binning and/or skipping, whereby the data production rate can be adjusted, preferably reduced.

According to some embodiments, the optical biometric sensor may comprise a memory storage configured to store data indicative of the acquired sensing signals for a time duration such that a data production rate is below or equal to the present data transfer capacity on the data transfer bus. Thus, in some alternative embodiments is a memory storage, e.g. a buffer or first in first out memory, used for storing, for a time duration, the acquired sensing signals such that the data production rate can be adapted to the present data transfer capacity on the data transfer bus. Preferably, the memory storage is arranged to store digitalized sensing signals, i.e. the memory storage is arranged to receive digital signals from analog to digital converters.

In some embodiments, if a data production rate resulting from the acquired sensing signals is below the present data transfer capacity on the data transfer bus, the optical biometric sensor may be configured to include arbitrary data in the data sent on the data transfer bus. Thus, if the image sensor is not able to transfer the amount of data requested by the host device, then the produced data may be complemented with arbitrary data, e.g. "dummy data", so that the requested data can be anyway transferred on the bus. Further, this advantageously may compensate for the internal clocks of the host and the biometric sensor not being perfectly synchronized, i.e. a delay between the clocks may be compensated for by including dummy data in the data to fill the bus so that the relevant data can be immediately transferred once produced.

In embodiments, the optical biometric sensor may be configured to, when data transfer to the host device is initiated, end exposure of the present subset of photodetectors. In other words, once the host requests data, the exposure is ended, and the produced data can be transferred from the biometric sensor to the host. This may advantageously allow for different exposure times between different subsets of photodetectors.

In embodiments, exposure time durations for the subsets of photodetectors may be equal.

In embodiments, the optical biometric sensor may comprise an analogue to digital conversion circuitry for converting analogue sensing signals acquired by the image sensor to digital sensing signals that are transferrable on the data transfer bus. In other words, the analogue to digital conversion circuitry is arranged to receive, at an input port, analogue sensing signals from the array of photodetectors, and to convert the analogue signals to digital signals, whereby the digital signals are provided, at an output port, to the data transfer bus. It is the digital sensing signals that are transferred on the data transfer bus to the host device.

In embodiments, the optical biometric sensor may be configured to start exposure of a subset of photodetectors in response to receiving a signal from a host controller of the host device. The signal from the host controller triggers the start of exposure. Advantageously, this provides perfect synchronization between the production of data by the image sensor and the read out over the data transfer bus, thereby eliminating any need for buffers or dummy data.

The timing circuitry may comprise a receiving port configured to receive the signal from the host controller on a communication bus.

Preferably, the host device is a master and the optical biometric sensor is a slave for the communication interface including the data transfer bus. For example, the optical biometric sensor may be an SPI (Serial Peripheral Interface) slave comprising a sensor communication interface having an SPI port comprising a serial clock input (SCLK); a master output slave input (MOSI); and a master input slave output (MISO), and a slave select input (CS).

Preferably, a subset of photodetectors comprises at least two photodetectors.

In some embodiments, a subset of photodetectors may comprise a complete row or column of photodetectors. In this case the image sensor is controllable to sequentially start exposure of subsets of photodetectors in a line-by-line sequence of photodetectors.

The image sensor may be a rolling shutter image sensor.

According to a second aspect of the invention, there is provided a timing circuitry arrangeable in an optical biometric sensor having an image sensor comprising an array of photodetectors, wherein for acquiring sensing signals, the image sensor is controllable to sequentially start exposure of subsets of photodetectors, the timing circuitry being configured to start exposure of a subset of photodetectors based on a present data transfer capacity on a data transfer bus configured to transfer data indicative of the acquired sensing signals from the optical biometric sensor to a host device.

The timing circuitry may be configured to control the start of exposure of a next subset of photodetectors such that a data production rate resulting from the acquired sensing signals is below or equal to the present data transfer capacity on the data transfer bus.

The timing circuitry may be configured to start exposure of a subset of photodetectors in response to receiving a signal from a host controller of the host device.

Further effects and features of the second aspect of the invention are largely analogous to those described above in connection with the first aspect of the invention.

According to a third aspect of the invention, there is provided a method for controlling an optical biometric sensor having an image sensor comprising an array of photodetectors for acquiring sensing signals, the optical biometric sensor being adapted to transfer data indicative of the acquired sensing signals on a data transfer bus to a host device, the method comprising: obtaining an indication of a present data transfer capacity on the data transfer bus; and controlling a start of exposure of a subset of photodetectors based on the present data transfer capacity on a data transfer bus.

In embodiments, the method may comprise controlling the start of exposure of a next subset of photodetectors such that the data production rate resulting from the acquired sensing signals is below or equal to the present data transfer capacity on the data transfer bus.

In embodiments, the method may comprise receiving a signal from a host controller of the host device, and, controlling the start exposure of a subset of photodetectors further in response to receiving the signal.

Further effects and features of the third aspect of the invention are largely analogous to those described above in connection with the first aspect and the second aspect of the invention.

There is further provided an electronic device comprising: the optical biometric sensor according to embodiments of the present disclosure, and processing circuitry configured to: receive a signal from the optical biometric sensor indicative of a biometric feature, and, perform a biometric authentication procedure based on the biometric feature.

The electronic device may be a mobile device. A mobile device may be a mobile phone, a tablet, a laptop computer, a smartwatch, etc.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the optical biometric sensor according to the present invention are mainly described with reference to an optical biometric sensor arranged under a display panel. However, it should be noted that the described imaging device also may be used in other optical biometric imaging applications such as in an optical fingerprint sensor located under a cover glass or the like, or under a cover on the back side of a mobile device.

Figure 1:
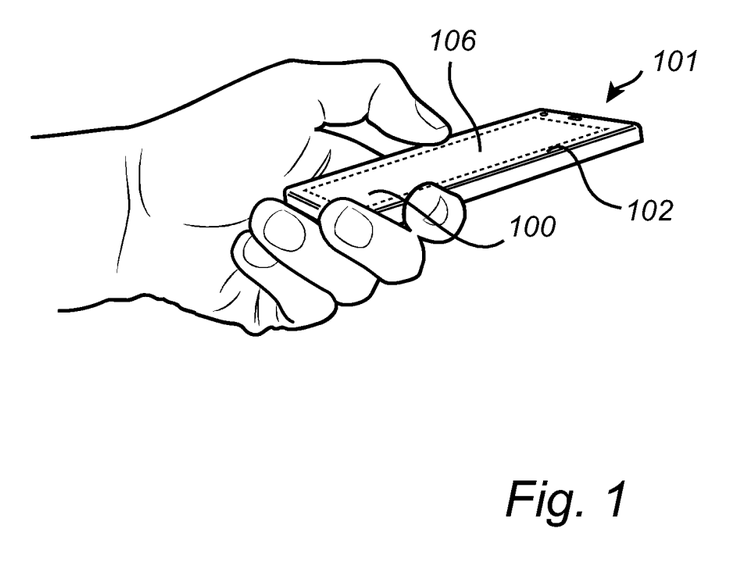
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display optical biometric sensor 100 and a display panel 102 with a touch screen interface 106. The optical biometric sensor 100 may, for example, be used for unlocking the mobile device 101 and/or for authorizing transactions carried out using the mobile device 101, etc.

The optical biometric sensor 100 is here shown to be smaller than the display panel 102, but still relatively large, e.g. a large area implementation. In another advantageous implementation the optical biometric sensor 100 may be the same size as the display panel 102, i.e. a full display solution. Thus, in such case the user may place his/her finger anywhere on the display panel for biometric authentication. The optical biometric sensor 100 may in other possible implementations be smaller than the depicted optical biometric sensor, such as providing a hot-zone implementation.

Preferably and as is apparent for the skilled person, the mobile device 101 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
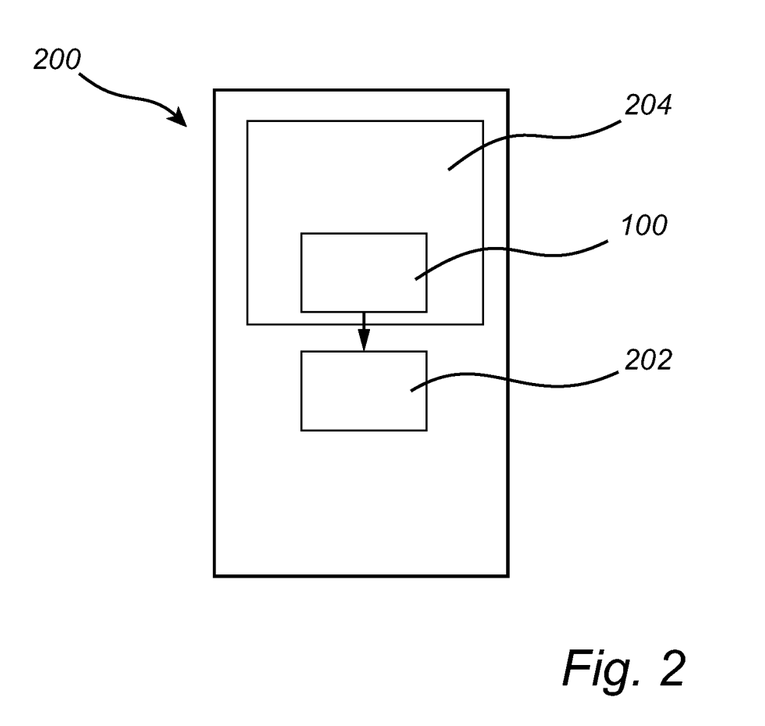
FIG. 2 is a schematic box diagram of an electronic device according to embodiments of the invention.

FIG. 2 is a schematic box diagram of an electronic device according to embodiments of the invention. The electronic device 200 comprises a transparent display panel 204 and an optical biometric sensor 100 conceptually illustrated to be arranged under the transparent display panel 204 according to embodiments of the invention. Furthermore, the electronic device 200 comprises processing circuitry such as control unit 202. The control unit 202 may be stand-alone control unit of the electronic device 202, e.g. a device controller. Alternatively, the control unit 202 may be comprised in the optical biometric sensor 100.

The control unit 202 is configured to receive a signal indicative of a detected object from the optical biometric sensor 100. The received signal may comprise image data. Based on the received signal the control unit 202 is arranged to detect e.g. a fingerprint. Based on the detected fingerprint the control unit 202 is configured to perform a fingerprint authentication procedure. Such fingerprint authentication procedures are considered per se known to the skilled person and will not be described further herein.

Figure 3:
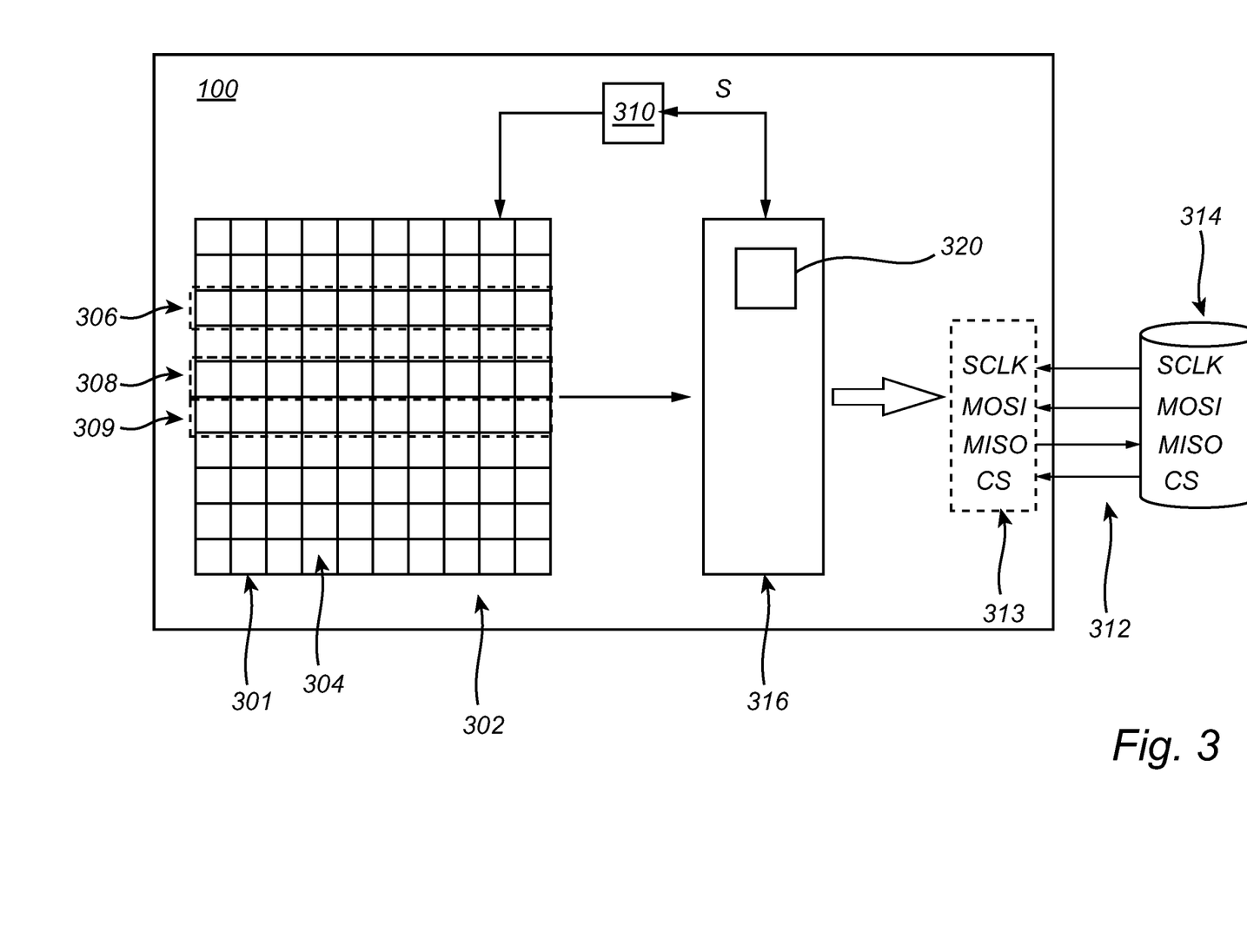
FIG. 3 schematically illustrates an optical biometric sensor and a host device according to embodiments of the invention.

FIG. 3 is a block diagram schematically describing an optical biometric sensor 100 according to embodiments of the invention. The optical biometric sensor 100 comprises image sensor 302 comprising an array 301 of photodetectors 304 of which not all are numbered. For acquiring sensing signals, the image sensor 302 is controllable to sequentially start exposure of subsets of photodetectors. Here, example subsets are indicated as 306, 308, 309. Note that in a normal imaging procedure, all the photodetectors are included in subsets that are sequentially exposed. For example, each row or column of the array 301 may be a subset of photodetectors.

Further, a timing circuitry 310 is configured to control the start of exposure of a subset 306, 308, 309 of photodetectors based on a present data transfer capacity on a data transfer bus 312 configured to transfer data indicative of the acquired sensing signals from the optical biometric sensor 100 to a host device 314. The optical biometric sensor 100 may be included in the host device 314 which may be e.g. the electronic device 200 or the mobile device 100.

The timing circuitry may in a conceptual manner be realized by a counter which starts counting, e.g. according to a command from the host device, to a given threshold value depending on the data transfer rate of the communication interface 312 (e.g. an SPI interface) and the exposure time duration. Once the threshold value is reached exposure of a new subset of pixels is started, and once exposure of a subset is completed the data from the subset is read-out by the read-out circuitry 316. The skilled person knows various possible ways of enabling such a counter, such as using a processor or any other suitable electrical component or circuitry.

The communication interface is exemplified as an SPI-interface 312. For this, the optical biometric sensor 100 may include a sensor communication interface 313 having an SPI port comprising a serial clock input (SCLK); a master output slave input (MOSI), a master input slave output (MISO), and a slave select input (CS).

The subsets 306, 308, 309 of photodetectors 304 are here illustrated as being an entire row of photodetectors in the array. However, other possible subsets are also conceivable such as a column of photodetectors or other groups of photodetectors. Preferably, as illustrated in FIG. 3, a subset of photodetectors comprises at least two photodetectors. Further, the image sensor 302 may be a rolling shutter image sensor.

The timing circuitry 310 is configured to control the start of exposure based on a present data transfer capacity on the data transfer bus 312. As mentioned above, the data transfer bus 312 may be a serial peripheral interface (SPI) or an I3C interface although other types of data transfer busses configured to transfer data are conceivable. The timing circuitry 310 has knowledge either directly or indirectly of the present data transfer capacity on the data transfer bus. For example, the timing circuitry 310 may receive information of the present data transfer capacity from the host device 314, or the present data transfer capacity may be a fixed transfer capacity given by the configuration or specification of the data bus itself, and in such cases may information of the data bus capacity be stored or accessible by the timing circuitry 310.

During image acquisition, subsets of photodetectors are sequentially exposed. Once exposure is finalized, the sensing signal are read-out via a read-out block 316, and subsequently they are transferred in digital form to the host device 314. The read-out block includes electrical components for transferring charges from the photodiodes of the image sensor pixel matrix to a voltage, e.g. an analog sensing signal, and for converting the analog signals to a digital signal, i.e. using analog to digital converters. However, if the rate of produced data is larger than the data transfer capability on the bus, the data must be stored before it can be transferred. Embodiments of the present disclosure aims to resolve this prior art problem.

Accordingly, if the data production rate can be adapted so that the data transfer bus 312 can handle the produced data, there is no or at least reduced need for intermediate storage of data. For achieving this, the start of exposure is appropriately controlled. Starting exposure of a next subset of photodetectors is performed in such a way that at least part of the produced data from a prior exposed subset of photodetectors is allowed enough time to be transferred to the host device 314. Thus, the timing between subsequent start of exposures are adapted according to the present data transfer capacity of the data transfer bus.

Preferably, the timing circuitry 310 is configured to control the start of exposure of a next subset of photodetectors such that a data production rate resulting from the acquired sensing signals is below or equal to the present data transfer capacity on the data transfer bus 312. In other words, when the data transfer bus 312 is operating to transfer data for a present subset of photodetectors, given its present data transfer capacity, the start of exposure of the next subset of photodetectors is timed such that the data production rate does not exceed the present data transfer capacity. In other words, the data that is read-out, available and "ready" for transfer does not exceed the data transfer capacity of the data transfer bus 312. For example, the start of exposure for the next subset, e.g. 309 can be initiated such that at the end of exposure, at least part of the data produced from the prior subset 308 or subsets, e.g. 308, 306 of photodetectors is already transferred to the host device thereby leaving data transfer capacity for the data from the next subset 309 of photodetectors. The relation between data production rate and start of exposure is conceptually understood from FIG. 4A.

Figure 4A:
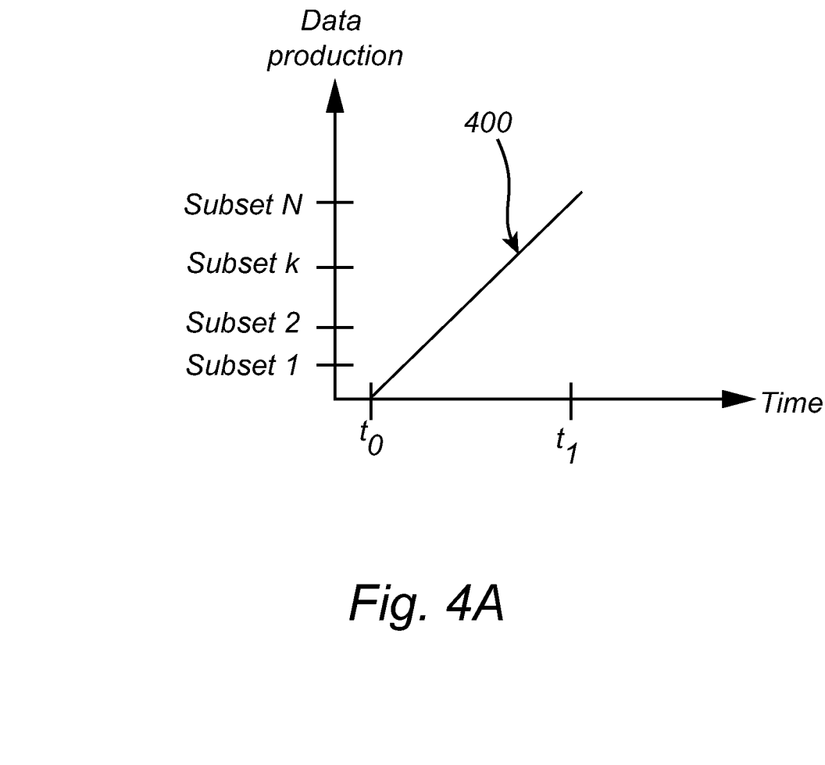
FIG. 4A conceptually illustrates the data production as function of time.

In FIG. 4A, the data production in terms of amount of produced data that is to be transferred, i.e. downstream of the read-out block 316 is on the y-axis, and time is on the x-axis. The solid line 400 starts at time t0 where sensing signals from none of the subsets of photodetectors have been read-out, i.e. no data has been produced, and ends at time t1 where all N subsets, of photodetectors of the image sensor have been exposed and read-out. The derivative, i.e. the gradient of the solid line 400 represents the data production rate. The y-axis conceptually illustrates the accumulated data produced from indicated subsets 1 to N, i.e. the accumulated amount of data after subset k has been read out.

Figure 4B:
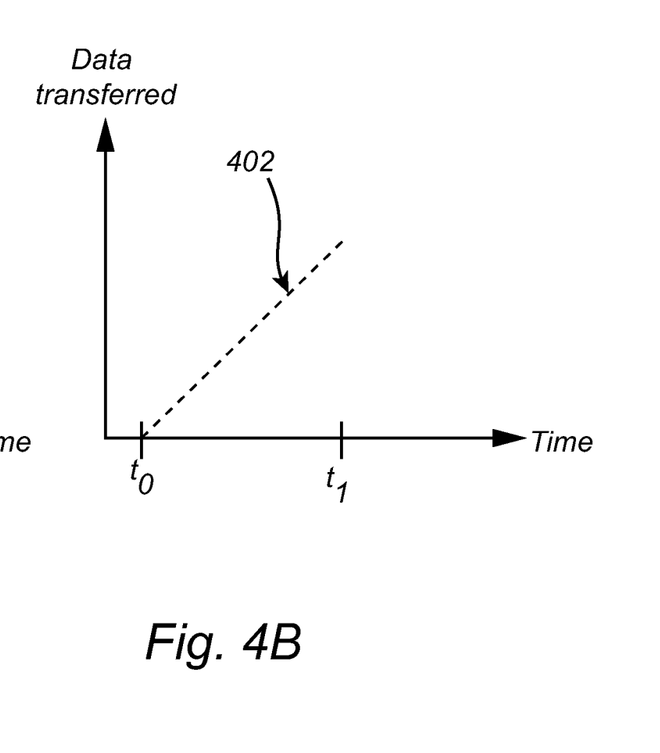
FIG. 4B conceptually illustrates an amount of transferred data as a function of time.

In addition, a dashed line 402 in FIG. 4B represents the data transferred from the optical biometric sensor to the host device. The gradient of the dashed line 402 represents the data transfer capacity, here in terms of the data transfer rate, of the data transfer bus 312, e.g. an SPI-bus. In this preferred example, the data is transferred at the same rate as it is produced, in other words, the gradient of the line 402 is the same as the gradient of line 400.

The gradient of the data production line 400, the data production rate, should not exceed the gradient of the data transfer line 402, the data transfer capacity. The gradient of the data production line 400, the data production rate, can be controlled by controlling the starts of the exposure of the subsets of photodetectors. If the delay between starts of exposures of a subsets of photodetectors is short, the data production rate is higher compared to using a longer delay between starts of exposures which will result in lower data production rate. Overall, with short delays between start of exposures, all the subsets will be exposed and read-out in less time compared to having longer delays, thereby short delays results in higher data production rate.

Since the data is read-out at the end of exposure, the time between read-out of data from the subsets of photodetectors depends on the time delay between starts of exposures. Consequently, the start of exposure of subsets of photodetectors is controlled such that the data production rate after read-out is below or equal to the present data transfer capacity rate.

Figure 5:
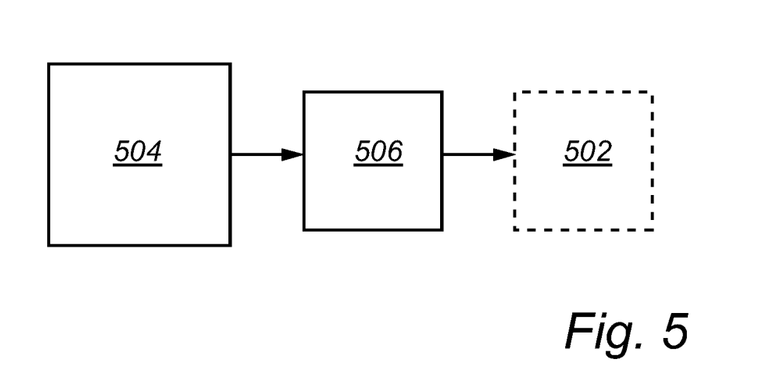
FIG. 5 conceptually illustrates the effect of data processing for reducing the amount of data to be transferred.

It may be desirable to adjust the amount of data to be transferred on the data bus. For this, the optical biometric sensor may be configured to perform data processing to adjust a data production rate resulting from the acquired sensing signals to thereby adjust an amount of data to transfer on the data transfer bus. Returning to FIG. 4A-B, if the gradient of the data production line 400 is steeper than the available data transfer capacity line 402, data processing may be performed in order to reduce the amount of produced data which consequently reduces the data production rate. FIG. 5 conceptually illustrates this concept, where the size of box 502 represents the available data transfer capacity on the data transfer bus 312 in FIG. 3 and the size of box 504 represents the data indicative of the acquired sensing signals. In order for the data transfer bus 312 to be able transfer the data 504, data processing such as digital image processing may be used for reducing the amount of produced data to representative box 506 which is adapted to the present data transfer capacity represented by box 502.

Example data processing is local post-processing settings of the image sensor adapted to cause a reduction in data production rate. For example, such local post-processing setting may be e.g. binning of the sensing signals, or generally pixel values, to thereby reduce the amount of produced data. Binning generally refer to combining a group of pixel values into a single data point. Another example local post-processing setting is skipping of photodetectors, e.g. not start exposure or not reading out the data from the photodetectors. A further example is masking of photodetectors in the array, i.e. so-called image masking where some pixel values are set to zero.

Returning to FIG. 3, generally, the host device 314 sends a request via the communication interface 312 to the optical biometric sensor, indicating that it requests image data. In order for the optical biometric sensor to fulfil this request, a certain number of bytes is expected on the communication interface 312, by the host device. Sending a request may include writing a command to a register via the communication interface. Such communication protocols, e.g. I3C or SPI are known per se. A data transfer bus is included in the communication interface 312.

Since the host device, including the SPI interface 312 generally runs on a different clock than the optical sensor 100, there is inevitably a delay between the clocks. For example, the image sensor 302 generally operates slower than the host SPI-interface. This may lead to the SPI-interface 312 to start attempting data transfer before the read-out out data from a subset of pixels is completed.

In the context of the present disclosure, if a data production rate resulting from the acquired sensing signals is below the present data transfer capacity on the data transfer bus 312, the optical biometric sensor 100 is configured to include arbitrary data in the data sent on the data transfer bus 312. In view of the above, if the image sensor is slower than the SPI-interface, this difference in operating speed may be compensated for by including dummy data in the data sent on the bus 312.

Figure 6:
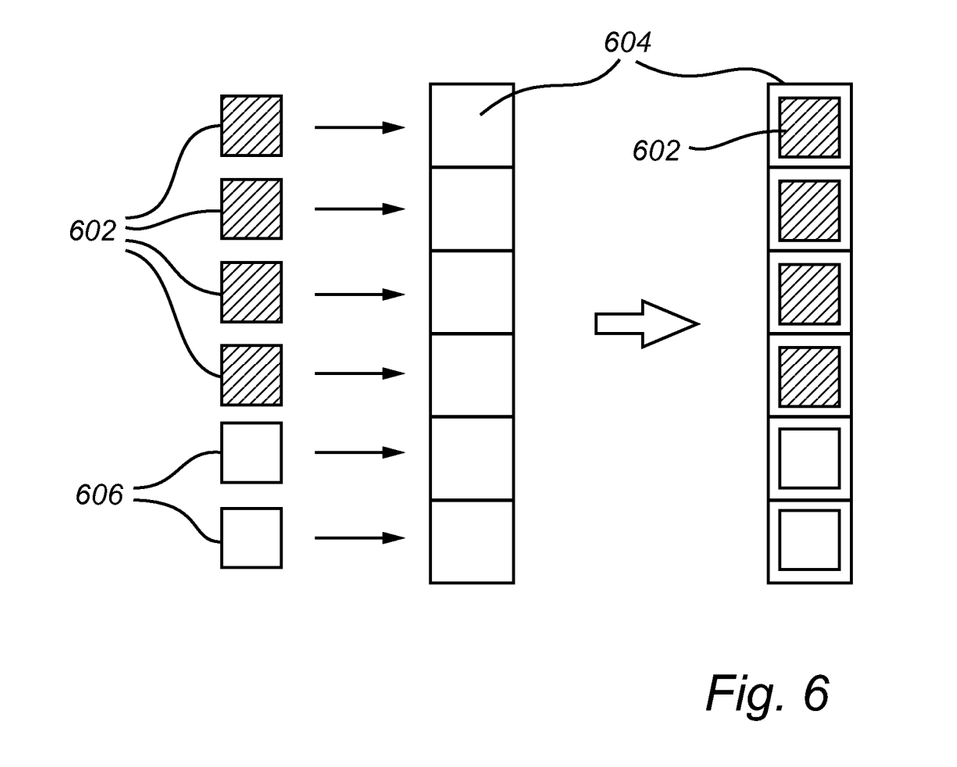
FIG. 6 conceptually illustrates the use of dummy data.

FIG. 6 conceptually illustrates produced digital data 602 that is going to be transferred on the bus. The available transfer capacity is conceptually illustrated as a set of "data slots" 604 of which one is numbered 604. In order to at least nearly continuously send data according to the present data transfer capacity, arbitrary data, i.e. dummy data 606, may be added to the produced data so that the produced data can be transferred. For example, once a subset of photodetectors has ended exposure and read-out of data has begun, it is desirable to ensure that the data transfer bus 312 can send the requested data before new data from a next subset of photodetectors is received. For this, dummy data 606 may be added so the former data 602 can be transferred to thereby enable transfer capacity for data from the next subset of photodetectors.

Further, performing digital processing the reduce the amount of data as described in relation to FIG. 5, may be combined with adding dummy data to the data to be transferred, thereby enabling efficient transfer of data. Thus, firstly, e.g. local-post processing may be performed on the acquire sensing signals, and dummy data is added before transfer on the bus.

Turning now again to FIG. 3, the optical biometric sensor may comprise a memory storage 320 configured to store data indicative of the acquired sensing signals for a time duration such that a data production rate is below or equal to the present data transfer capacity on the data transfer bus 312. The memory storage device 320, e.g. a buffer or FIFO-storage, is configured to store digitalized data before it is added to the SPI-interface 312. In case the memory storage 320 is empty or does not contain enough data for transfer on the bus 312, dummy data as described with reference to FIG. 6 may be added when the data is transferred on the bus. Thus, digital data from a subset of photodetectors stored in the buffer 320 may be combined with dummy data so that the SPI interface 312 always can receive data to be transferred. Preferably, the dummy data is added external to the buffer 320, e.g. downstream of the buffer before the SPI bus 312. However, dummy data may be added to the buffer although this is not the preferred embodiment.

The memory storage device 320 is preferably adapted to be able to store digital data originating form an entire subset of photodetectors.

It is desirable that the buffer 320 can receive the data from the next subset of photodetectors. In order to enable transfer of the data in the buffer 320, dummy data, as described above, may preferably be added downstream of the buffer 320, such that the data may be transferred on the SPI-interface to make room for the next set of digital data from the next subset of photodetectors.

Generally, the read-out block 316 comprises an analogue to digital conversion circuitry for converting analogue sensing signals acquired by the image sensor to digital sensing signals that are transferrable data on the data transfer bus 312.

Turning to e.g. FIG. 3 or FIG. 6, the optical biometric sensor through its timing circuitry 310 may be configured to start exposure of a subset of photodetectors in response to receiving a signal from a host controller of the host device 314, thereby facilitating transfer of data according to the data transfer capacity without the need for e.g. dummy data or memory storages. Thus, the timing circuitry may receive, at an input port, a signal S from the host controller via the communication interface 312 running according to a host internal clock, and in response start exposure of a subset of photodetectors of the image sensor. In other words, the optical biometric sensor may be configured to be controlled by a host controller to start the exposure of a next subset of photodetectors. For this, a start command may be received by the timing circuitry 310 from the host controller for start of exposure of each subset of photodetectors, or that the timing circuitry 310 is operative according to e.g. the SPI clock. In some possible implementations, it may lead to synchronizing clocks of the host controller and the optical biometric sensor 100 thereby facilitating transfer of data according to the data transfer capacity without the need for e.g. dummy data or memory storages.

The exposure time durations for the subsets of photodetectors may be equal. However, in embodiments of the present invention, optical biometric sensor 100 may be configured to, when data transfer to the host device 314 is initiated, end exposure of the present subset of photodetectors. For example, assume that the subset 306 has been subject to exposure for an exposure time, once SPI-interface 312 adds data to its register, the exposure of the photodetectors in the subset 306 is ended, and data transfer may be initiated.

The data transfer bus 312 may be an SPI bus including a communication line for the SPI clock to be connected to the read-out block 316 and to the host device controller's clock. This allows for the host device to be the master of the data transfer bus 312 and the optical biometric sensor is a slave for the communication interface including the data transfer bus 312.

In some embodiments, the exposure of the subsets of photodetectors is performed in a line-by-line manner, e.g. starting with the subset 301 and sequentially starting exposure of adjacent lines of photodetectors until the end subset 311 of photodetectors has been exposed.

As described above, there is provided a timing circuitry 310 arrangeable in an optical biometric sensor 100 having an image sensor 302 comprising an array of photodetectors 304, wherein for acquiring sensing signals, the image sensor 302 is controllable to sequentially start exposure of subsets 306, 308 of photodetectors. The timing circuitry 310 being configured to start exposure of a subset of photodetectors based on a present data transfer capacity on a data transfer bus 312 configured to transfer data indicative of the acquired sensing signals from the optical biometric sensor to a host device 314.

The timing circuitry 310 may be configured to control the start of exposure of a next subset of photodetectors such that a data production rate resulting from the acquired sensing signals is below or equal to the present data transfer capacity on the data transfer bus.

Further, the timing circuitry may be configured to start exposure of a subset of photodetectors in response to receiving a signal from a host controller of the host device.

The timing circuitry controls the image sensor to start the exposure of the subset of photodetectors.

Figure 7:
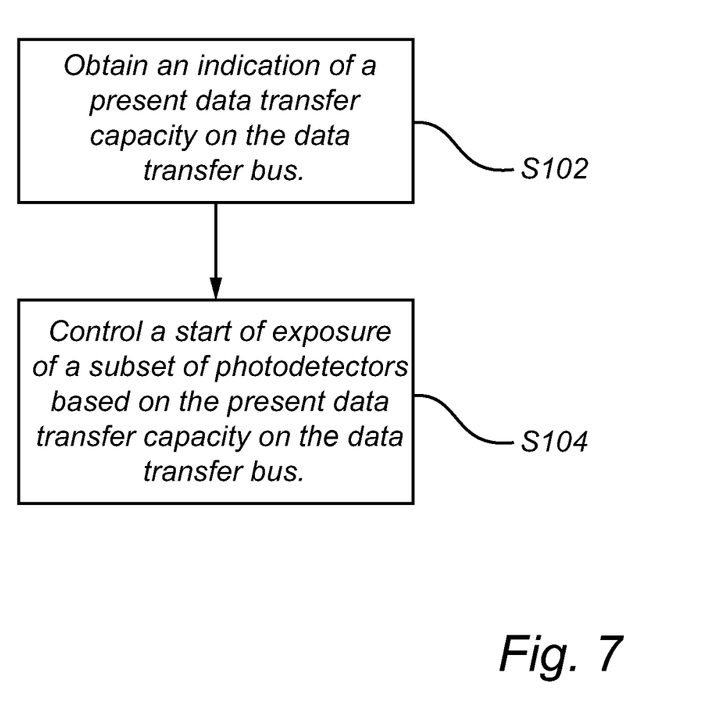
FIG. 7 is a flow-chart of method steps for controlling an optical biometric sensor according to embodiments of the invention.

FIG. 7 is a flow-chart of method steps according to embodiments of the invention. The method is for controlling an optical biometric sensor having an image sensor comprising an array of photodetectors for acquiring sensing signals, the optical biometric sensor being adapted to transfer data indicative of the acquired sensing signals on a data transfer bus to a host device.

The method comprises a step S102 of obtaining an indication of a present data transfer capacity on the data transfer bus. The indication may be received as a predetermined fixed data transfer capacity of the data transfer bus, or it may be received in a signal from the host device. In step S104, controlling a start of exposure of a subset of photodetectors based on the present data transfer capacity on a data transfer bus.

In step S104, controlling the start of exposure may be performed such that the start of exposure of a next subset of photodetectors results in that the data production rate resulting from the acquired sensing signals is below or equal to the present data transfer capacity on the data transfer bus.

Figure 8:
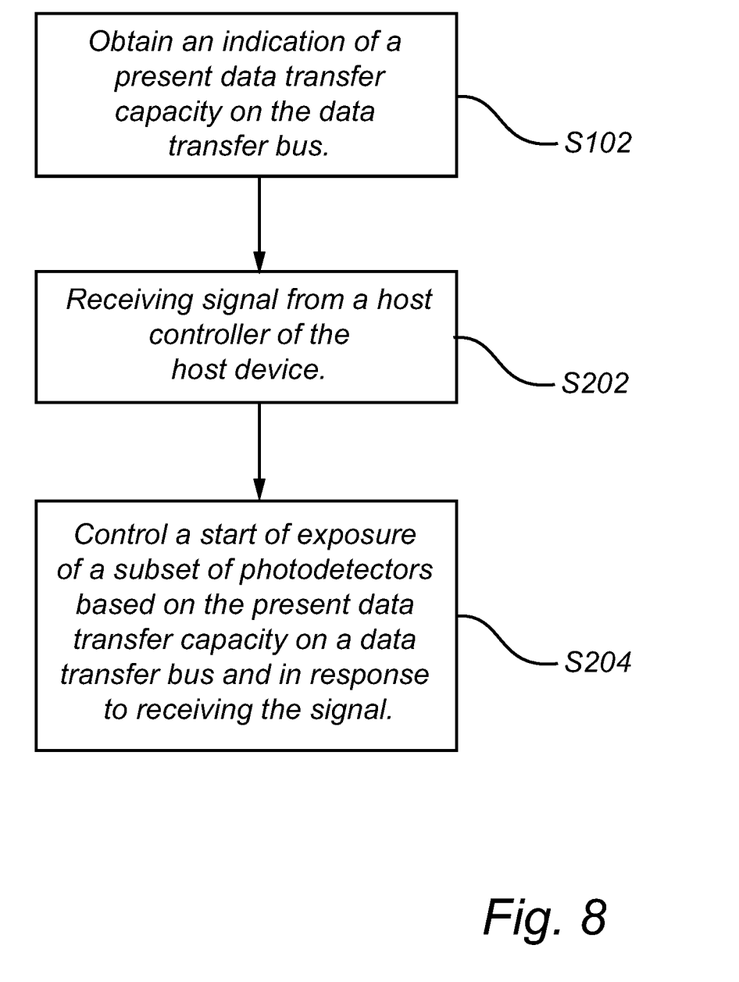
FIG. 8 is a flow-chart of method steps for controlling an optical biometric sensor according to embodiments of the invention.

In FIG. 8, there is a further step S202 of receiving signal from a host controller of the host device. In step S204, controlling a start of exposure of a subset of photodetectors based on the present data transfer capacity on a data transfer bus and further in response to receiving the signal.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the optical biometric sensor.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. Computer-readable media may generally correspond to (1) tangible computer-readable storage media which are non-transitory or (2) a communication media such as signal or carrier waves.

Even though the invention has been described with reference to specific exemplifying embodiments thereof, many different alterations, modifications and the like will become apparent for those skilled in the art. Also, it should be noted that parts of the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical biometric sensor comprising:
an image sensor comprising an array of photodetectors, wherein for acquiring sensing signals, the image sensor is controllable to sequentially start exposure of subsets of photodetectors; and
a timing circuitry configured to control the start of exposure of a subset of photodetectors such that a data production rate from the image sensor is adapted to a present data transfer capacity on a data transfer bus configured to transfer data indicative of the acquired sensing signals from the optical biometric sensor to a host device.

2. The optical biometric sensor according to claim 1, wherein the timing circuitry is configured to control the start of exposure of a next subset of photodetectors such that a data production rate resulting from the acquired sensing signals is below or equal to the present data transfer capacity on the data transfer bus.

3. The optical biometric sensor according to claim 1, configured to perform data processing to adjust a data production rate resulting from the acquired sensing signals to thereby adjust an amount of data to transfer on the data transfer bus.

4. The optical biometric sensor according to claim 3, wherein the data processing is local post-processing settings of the image sensor adapted to cause a reduction in data production rate.

5. The optical biometric sensor according to claim 1, comprising a memory storage configured to store data indicative of the acquired sensing signals for a time duration such that a data production rate is below or equal to the present data transfer capacity on the data transfer bus.

6. The optical biometric sensor according to claim 1, wherein if a data production rate resulting from the acquired sensing signals is below the present data transfer capacity on the data transfer bus, the optical biometric sensor is configured to include arbitrary data in the data sent on the data transfer bus.

7. The optical biometric sensor according to claim 1, configured to, when data transfer to the host device is initiated, end exposure of the present subset of photodetectors.

8. The optical biometric sensor according to claim 1, wherein exposure time durations for the subsets of photodetectors are equal.

9. The optical biometric sensor according to claim 1, comprising an analogue to digital conversion circuitry for converting analogue sensing signals acquired by the image sensor to digital sensing signals that are transferrable data on the data transfer bus.

10. The optical biometric sensor according to claim 1, configured to start exposure of a subset of photodetectors in response to receiving a signal from a host controller of the host device.

11. The optical biometric sensor according to claim 1, wherein the host device is a master and the optical biometric sensor is a slave for the communication interface including the data transfer bus.

12. The optical biometric sensor according to claim 1, wherein a subset of photodetectors comprises at least two photodetectors.

13. The optical biometric sensor according to claim 1, wherein a subset of photodetectors comprises a complete row or column of photodetectors.

14. The optical biometric sensor according to claim 1, wherein the image sensor is a rolling shutter image sensor.

15. An electronic device comprising:
the optical biometric sensor according to claim 1, and
processing circuitry configured to:
receive a signal from the optical biometric sensor indicative of a biometric feature, and
perform a biometric authentication procedure based on the biometric feature.

16. The electronic device according to claim 15, wherein the electronic device is a mobile device.

17. A timing circuitry arrangeable in an optical biometric sensor having an image sensor comprising an array of photodetectors, wherein for acquiring sensing signals, the image sensor is controllable to sequentially start exposure of subsets of photodetectors,
the timing circuitry being configured to start exposure of a subset of photodetectors such that a data production rate from the image sensor is adapted to a present data transfer capacity on a data transfer bus configured to transfer data indicative of the acquired sensing signals from the optical biometric sensor to a host device.

18. The timing circuitry according to claim 17, configured to control the start of exposure of a next subset of photodetectors such that a data production rate resulting from the acquired sensing signals is below or equal to the present data transfer capacity on the data transfer bus.

19. The timing circuitry according to claim 17, configured to start exposure of a subset of photodetectors in response to receiving a signal from a host controller of the host device.

20. A method for controlling an optical biometric sensor having an image sensor comprising an array of photodetectors for acquiring sensing signals, the optical biometric sensor being adapted to transfer data indicative of the acquired sensing signals on a data transfer bus to a host device, the method comprising:
obtaining an indication of a present data transfer capacity on the data transfer bus; and
controlling a start of exposure of a subset of photodetectors such that a data production rate from the image sensor is adapted to the present data transfer capacity on a data transfer bus.

* * * * *